Sept. 20, 1971   W. E. HEESE ET AL   3,605,409
HYDRAULIC ACTUATOR

Filed April 1, 1969   3 Sheets-Sheet 2

INVENTORS
WILLIAM E. HEESE &
BY KENNETH H. MEYER

Freeman & Taylor

ATTORNEYS

United States Patent Office 3,605,409
Patented Sept. 20, 1971

3,605,409
HYDRAULIC ACTUATOR
William E. Heese and Kenneth H. Meyer, Akron, Ohio, assignors to Hydra-Power, Inc., Wadsworth, Ohio
Filed Apr. 1, 1969, Ser. No. 812,176
Int. Cl. F15b 15/18
U.S. Cl. 60—52R                           6 Claims

ABSTRACT OF THE DISCLOSURE

A hydraulic rotary actuator that is provided with integral relief valves in the pistons for protective purposes. The actuator also has a self-contained, hydraulic system that features an enlarged gear chamber that serves both as a mounting base for a pump or power source and as a sump or reservoir for the hydraulic component that, in turn, actuates the actuator. A further characteristic of the hydraulic actuator is the optional provision of a shock absorbing component adapted to cushion the actuated piston toward the end of its power stroke. Also, the rack supporting means are interconnected to the main housing so as to, at all times, provide improved support.

BACKGROUND OF THE INVENTION

Rotary actuators of the rack and pinion type have long been recognized as a means of utilizing hydraulic or other pressure on the piston-like end of a rack that, in turn, meshes with a spur gear so as to provide rotary movement to the spur gear upon linear reciprocation of the rack.

DESCRIPTION OF THE PRIOR ART

Representative patents teaching this basic principle are Parsons U.S. Pat. 2,408,338 and Smith U.S. Pat. 1,196,041.

While rotary actuators of this general type have enjoyed a measure of commercial success, there nonetheless are certain inherent disadvantages with regard to the same.

First and foremost of these disadvantages is the requirement for a separate source of pressurized hydraulic fluid with this fluid being necessary for the purpose of imparting linear reciprocation to the rack so as to result in rotational movement of the gear component as noted above.

The problems of piping this fluid and the possible dangers that result from escape of the fluid have limited the number of applications in which actuators of this general type can be employed.

A second disadvantage exists with respect to the operating principles because of the high pressures that are employed. The difficulty that is encountered in this regard lies in stopping the longitudinal movement of the rack once the same is started in motion.

The third disadvantage of the known prior art exists with respect to the construction of the piston heads themselves, in that the same are not provided with pressure relief valves with the result that in the event of abnormal pressure build-ups, destruction of the unit oftentimes results.

The fourth disadvantage of the known prior art exists with respect to the failure to provide adequate self-aligning back-up or support surfaces for the rack during the period of its movement longitudinally, with the result that galling or other damage occurs to the cylinder to result in premature destruction of the unit.

SUMMARY OF THE INVENTION

It has been discovered that the above disadvantages of the prior art can be obviated by producing an improved rotary actuator that is characterized by several improvements which may be summarized as follows.

First, the conventional gear chamber employed in actuators of this type is abnormally enlarged so as to serve as a mounting base for the motor and pump which are associated with the actuator. This chamber also serves as a sump or reservoir for the pump. By this arrangement, the unit is, in effect, self-contained and installation at the point of use does not require the installation of any hydraulic piping but merely requires connecting the unit to a source of electrical power.

A second improvement relates to the provision of one or more shock absorbers at the longitudinal ends of the cylinder within which the rack and pistons reciprocate, with this cylinder being designed to cushion the piston toward the end of its power stroke so as to avoid damage to the unit.

A third improvement relates to the provision of self-contained pressure relief means in the piston heads per se so as to eliminate the dangers that can arise from excessive pressure build-ups from external mechanical loads that would otherwise result in destruction of the unit. The piston heads are also modified to include a bearing ring that serves as the contact point between the rack and piston unit on the one hand and the cylinder wall on the other hand, with this ararngement insuring maximum efficiency of operation.

The fourth improvement relates to the incorporation of self-aligning bearings to efficiently support the side component force caused by the gear action on the rack.

A fifth improvement relates to using the gear chamber as a sump which not only effectuates a saving of space but guarantees continuous lubrication of the meshing gears due to the presence of the hydraulic fluid.

Accordingly, production of an improved actuator having the above characteristics becomes the principal object of this invention with other objects thereof becoming more apparent upon a reading of the following brief specification considered and interpreted in view of the accompanying drawings.

DETAILED DESCRIPTION OF THE INVENTION

Figure 1:
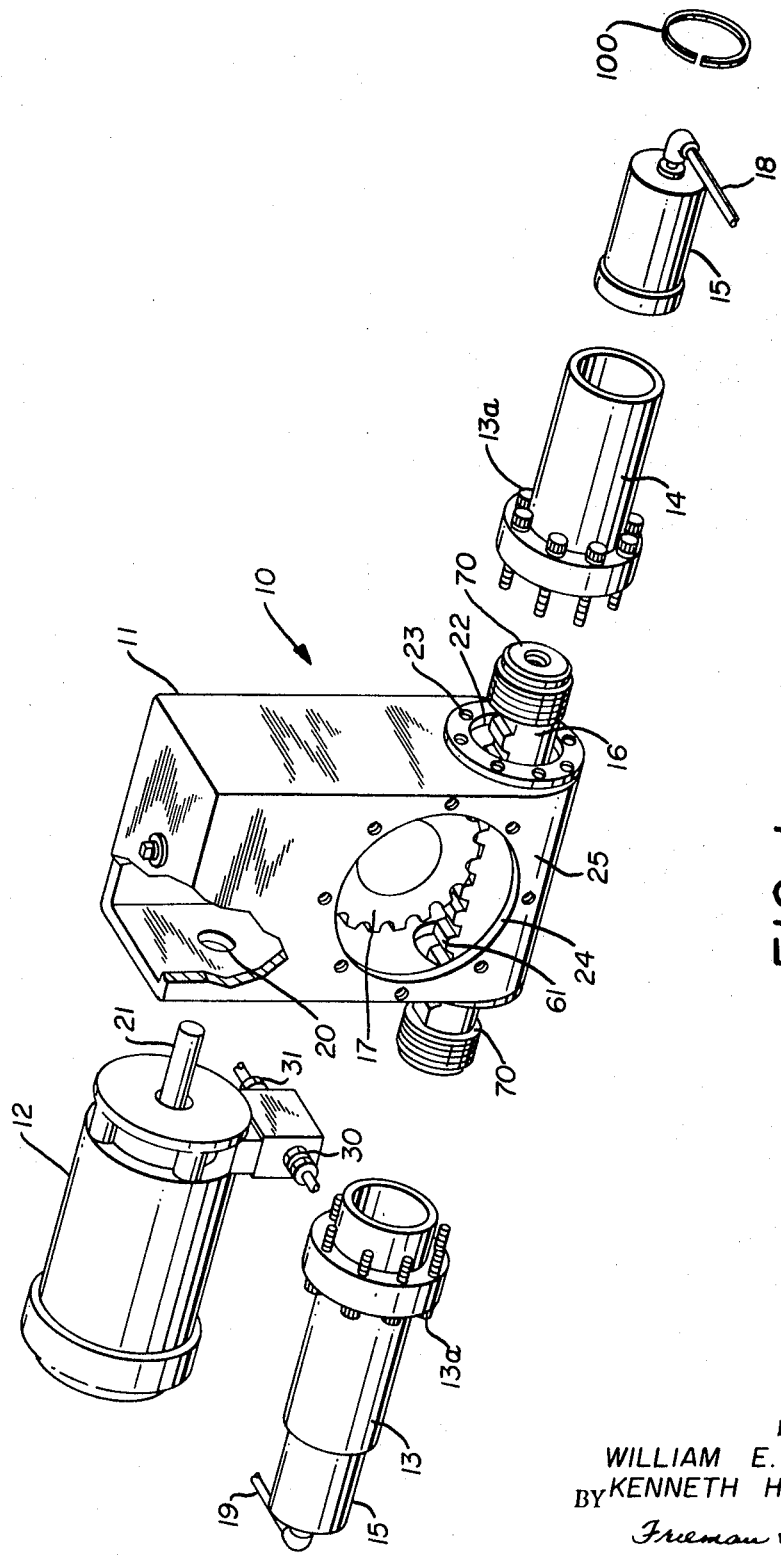
FIG. 1 is a perspective view of the improved rotary actuator in partially exploded and broken away pictoral representation.
Figure 2:
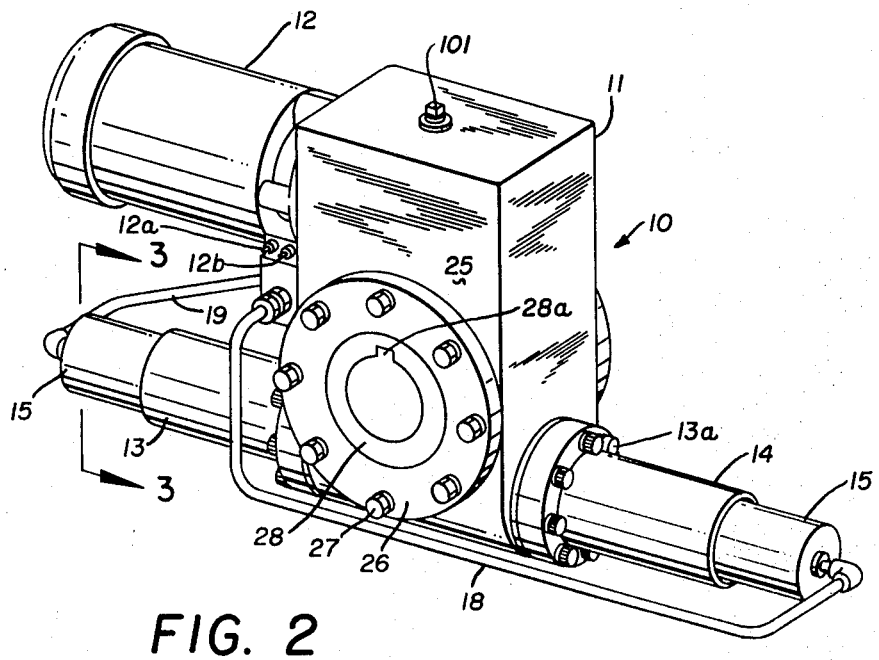
FIG. 2 is a perspective view similar to FIG. 1 but showing the unit in assembled condition.

Referring now to the drawings and in particular to FIGS. 1 and 2 thereof, the improved rotary actuator, generally designated by the numeral 10, includes a main housing 11, an electrically operated, hydraulic power unit or pump 12, opposed cylinders 13 and 14, each having identical shock absorbing units 15, 15, rack and piston unit 16 and a spur gear 17, with the arrangement being such that the spur gear 17 is rotatably mounted by appropriate means within the housing 11, so as to mesh with the teeth of the rack and piston unit 16 which, in turn, reciprocates within the cylinders 13 and 14 dependent upon the direction of pressure application through the piping conduits 18 and 19.

Figure 5:
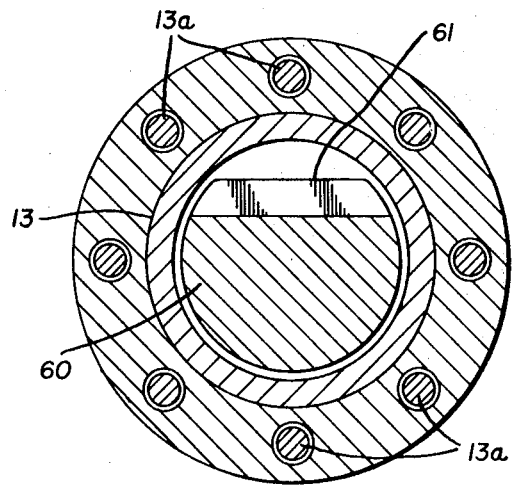
FIG. 5 is a sectional view taken on the lines 5—5 of FIG. 3.

Referring to the housing 11, the same is shown as preferably being of cast construction so as to define a generally rectangular cavity that is rounded at the lowermost region for reception of the contoured rack and pinion unit as is best illustrated in FIG. 5. In this regard, only housing 11 will normally be a casting with the pump being welded thereto.

Figure 3:
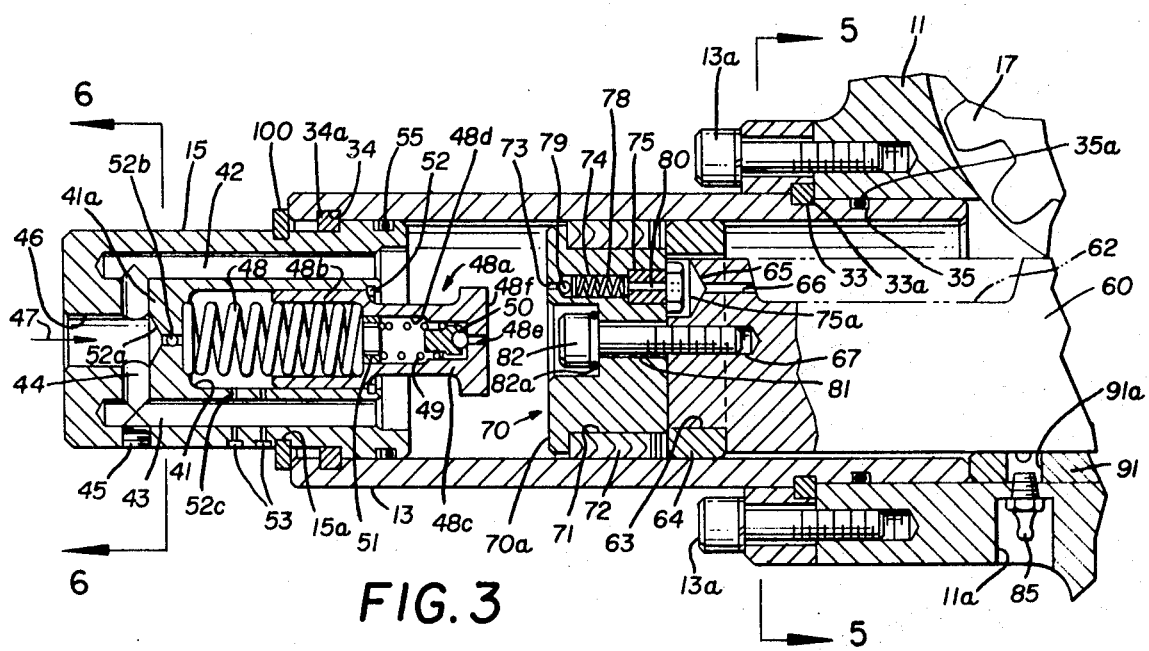
FIG. 3 is a sectional view taken on the lines 3—3 of FIG. 2 and illustrating a typical end construction.

An opening 20 is provided in the wall of housing 11 for the purpose of communicating with the inlet component 21 of the unit 12 and axially aligned opposed openings 22, 22 are provided near the bottom of housing 11 together with tapped holes 23, 23 that encircle the openings 22, 22 as shown in FIG. 1 for the purpose of attaching the cylinder units 13 and 14 thereto as is apparent from FIGS. 2 and 3 of the drawings.

A large opening 24 is further provided on the frontal wall 25 of the housing 11 for the purpose of permitting insertion of the gear 17 with this opening ultimately being covered by a cover plate 26 that is positioned in overlying relationship therewith by bolts 27, 27 as clearly shown in FIG. 2 of the drawings.

Further, an appropriate sleeve 28 having a keyway 28a is further provided on plate 26 for attachment to the drive shaft of the unit being operated.

With reference to the power or pump unit 12, the same is of conventional construction and does not, per se, form a part of this invention. Suffice it to say that the same has an electrically operated pumping arrangement that permits hydraulic fluid to be withdrawn from the tank 11 through conduit 21 and then emitted, under pressure, to either the pipe system 18 and thus to cylinder unit 14 via connection 30 or to the cylinder unit 13 via conduit system 19 and connection 31.

Since cylinders 13 and 14 are identical in construction, only cylinder 13 will be described in detail.

Figure 4:
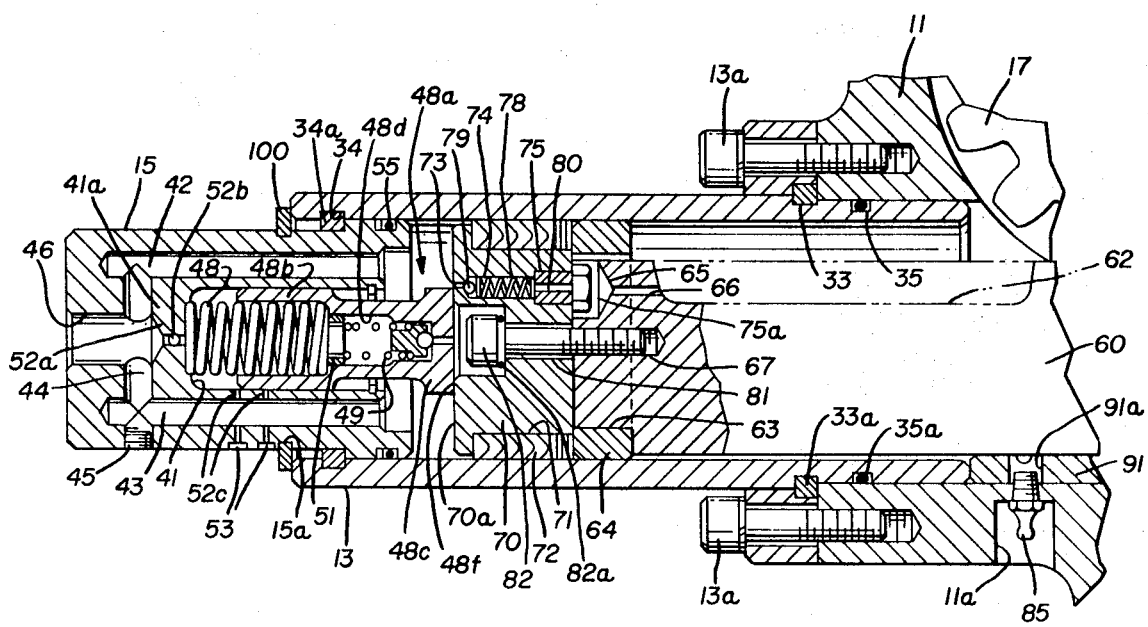
FIG. 4 is a view similar to FIG. 3 but illustrating the rack in a position toward the end of its power stroke and further illustrating the functional operation of the shock absorber.

Turning now then to the detailed construction of the cylinder 13 as shown best in FIGS. 3 and 4, it will be noted that the same is of tubular configuration and further includes undercut grooves, 33, 34 and 35 within which locking rings 33a, 34a and O-ring 35a may be respectively received for known purposes of connecting and sealing the unit in assembly with housing 11 and shock absorber 15 as is clearly apparent from FIG. 3 of the drawings. In this regard, locking ring 33a serves to connect the wall of cylinder 13 with respect to the housing 11, while locking ring 34a serves to connect the shock absorber unit 15 with respect to the cylinder 13 to prevent movement to the left of FIG. 3.

An additional locking ring 100 is received in cutout area 15a of shock absorber 15 to further prevent movement of shock absorber 15 to the right of FIG. 3.

The cylinder 13 is mounted on housing 11 in concentric alignment with one of the openings 22 by screwing bolts 13a, 13a into tapped holes 23, 23 as shown in FIG. 2.

Figure 6:
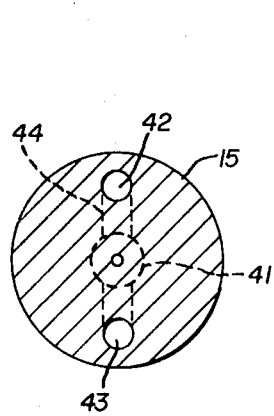
FIG. 6 is a sectional view taken on the lines 6—6 of FIG. 3.

Turning next to the construction of the shock absorber 15 and referring particularly to FIGS. 3, 4 and 6, it will be noted that the same is of cylindrical configuration, being first provided with a central bore 41 and being next provided with diagonally opposed bores 42 and 43, with the bores 42 and 43 being interconnected by a transverse bore 44 that is made by drilling through the outer wall of the unit 15 and then placing an appropriate plug 45 therein as best shown in FIGS. 3 and 4.

An axial bore 46 is provided for connecting the network of bores 42, 43 and 44 with the conduit 19 and in this fashion, fluid moving under pressure in the direction of arrow 47 can enter through bore 46 and be directed toward the interior of cylinder 13 first through bore 44 and thence through bores 42 and 43.

Telescopically positioned within the central bore 41 are main coil spring 48 and a plunger unit 48a, with the plunger unit 48a having a hollow circular flange 48b within which one end of the spring may be seated as is clearly shown in FIG. 3. The remaining end of spring 48 is then seated against wall 41a.

The stem portion 48c of plunger 48a is further provided with a reduced diameter internal bore 48d within which a second spring 49 and a ball check unit 50 may be positioned with ring 51 serving to retain the spring 49 and unit 50 in captive position within the bore 48d while lock ring 52 serves to permit axial separation of the unit 48 with respect to bore 41 and to cushion plunger 48a when it moves to the right of FIG. 3.

An opening 48e is provided in the projecting extremity of the plunger 48a for fluid transmission purposes as will be described in greater detail below, while additional openings 52c, 52c are provided in the wall between bores 41 and 43 for purposes that will also be further described.

In this regard, the bores 52c, 52c are made by drilling through the outer wall as at 53, 53, followed by plugging in conventional fashion. A seal 55 insures a fluid-tight connection between the cylinder 13 and the shock absorber 15.

Turning now to the construction of the rack and piston unit, generally earlier designated by the numeral 16, it will be noted from FIGS. 3, 4 and 5 that the rack component thereof includes an elongated rack 60 provided with conventional teeth 61, 61 and being undercut as at 62. The opposed axial ends of the rack 60 are further undercut as at 63 so as to receive a bronze ring 64 with the ring 64 serving as the contact component between the units 60 and 70 and the interior wall of each cylinder 13 and 14.

Further and as shown in FIG. 3, for example, each axial end of rack 60 is provided with a bore 65 that communicates with a reduced diameter bore 66 so as to, in effect, provide a relief valve that extends axially through the end wall and opens into the undercut portion 62 and the center gear chamber in order to relieve shock pressure fluid.

Secured to each axial end of the rack 60 is a piston head 70 having an undercut peripheral surface 71 within which appropriate sealing elements 72, 72 may be received. These sealing elements 72, 72 are preferably one-way type seals that do not seal against pressure loss from the gear chamber. A series of stepped and progressively increasing bores 73, 74 and 75 are further provided in concentric alignment between the opposed faces of each piston head 70, with the bore 74 receiving a spring 78 and a ball 79 and with the bore 75 receiving an especially contoured bolt 75a that is provided with a central aperture 80 that extends therethrough for concentric alignment with bores 65 and 66 of the rack.

A countersunk central threaded bore 81 in piston head 70 is aligned with a threaded bore 67 in the rack and receives an appropriate bolt 82 that serves to connect each head 70 to one axial end of the rack member 60. Sealing element 82a beneath the head of bolt 82 provides a fluid-tight connection between piston head 70 and cylinders 13 and 14.

As will be noted from FIG. 3, the ends of the respective cylinders 13 and 14 are received within the opposed bores 22, 22 of the housing 11, are spaced from each other and within this space is provided a substantially semi-circular bearing 91 which has a thickness greater than the wall thickness of the cylinder 13 so as to serve as the point of support for the underside of the rack member 60 during the reciprocal travel thereof that occurs during use.

A lubrication fitting 85 is provided in opening 11a in housing 11 and serves to interconnect, through opening 91a, in the bearing 91 so as to prevent relative rotation between housing 11 and liner 91, while simultaneously serving the function of providing lubrication to the interior of the unit at a critical area.

In use or operation of the improved hydraulic rotary actuator, it will first be assumed that the component parts have been assembled to the condition indicated in FIGS. 2 through 6 of the drawings.

At this point, when it is desired to obtain rotary movement of a shaft received within the opening 28 for example, it is merely necessary that the unit 12 be operated to pressurize either the line 18 or 19 with it being noted that electrical contact points 12a and 12b are provided for the purpose of permitting electrical operation of the unit 12 and with it being further understood that appropriate cylinder valves are provided in known fashion so as to effectuate selective pressurization of the desired line 18 or 19.

Assuming the line 18 to be pressurized, the rack 60 will be moving to the left of FIG. 3 and as the same moves to the left, the outboard end 70a of the piston head 70 will come in contact with the outboard end 48f of the plunger 48a. Further movement of the rack and piston unit 16 to the left will result in equivalent movement to the left of the unit 48a so as to overcome the force of spring 48. Since the chamber 41 will be filled with fluid, it will become apparent that this fluid will have to be compressed in order for continued movement of the rack and piston unit to occur and complete compression to the point of overcoming the force provided by the advancing rack and piston unit 16 is prevented by the oil being relieved through the bores 52c, 52c as well as through the bore 52a. Bore 52a may be reduced or increased at will by means of adjustment screw 52b in order to provide more or less deceleration.

By this arrangement of using the confined hydraulic fluid as a cushion and by gradually relieving the pressure, a cushioning effect is obtained with the oil that thus emits being directed into the bores 42, 43 and 44.

When the return stroke is desired, the line 19 will be pressurized and at this time, oil entering in the direction of arrow 47 will first enter bore 46 and will thence pass through bores 43 and 44 so as to apply pressurized force against the face 70a and cause movement to the right. During this period, oil will also enter through port 48e and check valve 50 so as to again fill the chamber 41 for subsequent use as a shock absorber in the manner just described during the return stroke.

It is believed apparent that whenever the unit needs lubrication that the same can be effectuated by introducing a lubricant through the unit 85 and similarly in the event the oil supply becomes low, the reservoir defined by the interior of the tank can be replenished by removing cap 101 and simply adding oil.

While a full and complete description of the invention has been set forth in accordance with the dictates of the patent statutes, it is to be understood that the invention is not intended to be limited to the specfic form herein shown.

Accordingly, modifications of the invention may be resorted to without departing from the spirit hereof or the scope of the appended claims.

What is claimed is:

1. A hydraulic rotary actuator of the character described, comprising;
   (A) a hollow housing;
   (B) a pair of cylinders
      (1) opening into the interior of said housing and
      (2) projecting from opposed sides of said housing;
   (C) a hydraulic pump
      (1) mounted on said housing;
   (D) means for interconnecting said pump with the interiors of said housing and said cylinders;
   (E) rack and gear means carried interiorly of said housing and said cylinders;
   (F) a pair of pistons carried on opposed ends of said rack;
   (G) said rack being reciprocal linearly within said housing upon actuation of said pump and being adapted to impart rotary motion to said gear upon said reciprocation;
   (H) each of said pistons carrying pressure relief means which include a normally closed through axial bore and valve means that are opened in response to pressure build-ups within said cylinders; and
   (I) a pair of spring-loaded shock absorber elements, one of said shock absorbers being mounted on the outboard end of each cylinder and adapted to contact said pistons and cushion the initial force of said pistons during reciprocal movement of said rack.

2. A hydraulic rotary actuator of the character described, comprising;
   (A) a hollow housing;
   (B) a pair of cylinders
      (1) opening into the interior of said housing and
      (2) projecting from opposed sides of said housing;
   (C) a hydraulic pump
      (1) mounted on said housing;
   (D) means for interconnecting said pump with the interiors of said housing and said cylinders;
   (E) rack and gear means carried interiorly of said housing and said cylinders;
   (F) a pair of pistons carried on opposed ends of said rack;
   (G) said rack being recoprical linearly within said housing upon actuation of said pump and being adapted to impart rotary motion to said gear upon said reciprocation;
   (H) each of said pistons carrying pressure relief means which include a normally closed through axial bore and valve means that are opened in response to pressure build-ups within said cylinders; and
   (I) a self-aligning bearing carried in said housing and supporting said rack.

3. A hydraulic rotary actuator of the character described, comprising;
   (A) a hollow housing;
   (B) a pair of cylinders
      (1) opening into the interior of said housing and
      (2) projecting from opposed sides of said housing;
   (C) a hydraulic pump
      (1) mounted on said housing;
   (D) means for interconnecting said pump with the interiors of said housing and said cylinders;
   (E) rack and gear means carried interiorly of said housing and said cylinders;
   (F) a pair of pistons carried on opposed ends of said rack;
   (G) said rack being reciprocal linearly within said housing upon actuation of said pump and being adapted to impart rotary motion to said gear upon said reciprocation;
   (H) each of said pistons carrying pressure relief means which include a normally closed through axial bore and valve means that are opened in response to pressure build-ups within said cylinders; and
   (I) a pair of shock absorber elements, one of which is mounted on the outboard end of each cylinder and adapted to cushion the force of said pistons during reciprocal movement of said rack, and each including
      (1) a cylindrical housing mounted on the outboard end of said cylinder, and
      (2) a spring-loaded plunger carried internally of said housing and adapted to absorb the force of one said pistons upon actuation thereof.

4. The device of claim 2 further characterized by the fact that said bearing is mounted in the bottom of said housing and has an arcuate supporting surface; said rack having an arcuate undersurface and being supported on said supporting surface of said bearing.

5. The device of claim 4 further characterized by the presence of means for maintaining said bearing in position within said housing.

6. A hydraulic rotary actuator, comprising;
   (A) a hollow housing;

(B) a pair of opposed hollow cylinders
    (1) opening into the interior of said housing and
    (2) projecting from opposed sides of said housin in coaxial alignment with each other;
(C) means for supplying hydraulic fluid under pressure
    (1) mounted on said housing and
    (2) adapted to supply said fluid to the interiors of said cylinders;
(D) a rack
    (1) reciprocally carried within said housing and said cylinders;
(E) a gear
    (1) mounted within said housing and
    (2) meshing with said rack.

References Cited

UNITED STATES PATENTS

| | | | |
|---|---|---|---|
| 1,998,103 | 4/1935 | Smith | 60—52C.O. |
| 2,783,743 | 3/1957 | Pappas | 60—52C.O. |
| 3,092,083 | 6/1963 | Sheppard | 91—401X |
| 2,389,654 | 11/1945 | Van der Werff | 91—401X |
| 3,213,760 | 10/1965 | Carr | 92—85X |

EDGAR W. GEOGHEGAN, Primary Examiner

U.S. Cl. X.R.

60—52CD, 52US; 92—85, 147; 91—401